(12) United States Patent
Shanks et al.

(10) Patent No.: US 11,728,975 B2
(45) Date of Patent: Aug. 15, 2023

(54) SYSTEMS AND METHODS FOR SELECTIVE ACCESS TO LOGS

(71) Applicant: Palantir Technologies Inc., Palo Alto, CA (US)

(72) Inventors: Vaughan Shanks, Kew (AU); Andrew Lampert, Pascoe Vale South (AU)

(73) Assignee: Palantir Technologies Inc., Denver, CO (US)

( * ) Notice: Subject to any disclaimer, the term of this patent is extended or adjusted under 35 U.S.C. 154(b) by 93 days.

(21) Appl. No.: 17/481,221

(22) Filed: Sep. 21, 2021

(65) Prior Publication Data

US 2022/0006623 A1 Jan. 6, 2022

Related U.S. Application Data

(63) Continuation of application No. 15/991,366, filed on May 29, 2018, now Pat. No. 11,133,925.

(60) Provisional application No. 62/595,857, filed on Dec. 7, 2017.

(51) Int. Cl.

| H04L 9/08 | (2006.01) |
|---|---|
| H04L 9/40 | (2022.01) |
| G06F 21/62 | (2013.01) |
| H04L 9/32 | (2006.01) |
| H04W 12/08 | (2021.01) |
| H04W 12/06 | (2021.01) |
| H04W 12/04 | (2021.01) |

(52) U.S. Cl.
CPC ............ *H04L 9/0825* (2013.01); *G06F 21/62* (2013.01); *H04L 9/083* (2013.01); *H04L 9/0894* (2013.01); *H04L 9/3226* (2013.01); *H04L 63/0435* (2013.01); *H04W 12/04* (2013.01); *H04W 12/06* (2013.01); *H04W 12/08* (2013.01); *G06F 2221/2101* (2013.01); *G06F 2221/2107* (2013.01)

(58) Field of Classification Search
CPC ............ G06F 21/62; G06F 2221/2101; G06F 2221/2107; H04L 63/0435; H04L 9/0825; H04L 9/083; H04L 9/0894; H04L 9/3226; H04W 12/04; H04W 12/06; H04W 12/08
See application file for complete search history.

(56) References Cited

U.S. PATENT DOCUMENTS

| 2003/0236992 A1* | 12/2003 | Yami | ...................... H04L 43/00 726/23 |
|---|---|---|---|
| 2005/0160095 A1* | 7/2005 | Dick | ...................... H04L 67/14 |

(Continued)

OTHER PUBLICATIONS

Examination Report dated Feb. 10, 2023, issued in related European Patent Application No. 18209980.4 (8 pages).

*Primary Examiner* — Theodore C Parsons
(74) *Attorney, Agent, or Firm* — Sheppard Mullin Richter & Hampton LLP

(57) ABSTRACT

Systems are provided for managing access to a log of dataset that is generated when the dataset is accessed. A system stores, with respect to each of a log producer and a log accessor, an encrypted symmetric key for dataset that is encrypted using a corresponding public key. The system returns the encrypted symmetric key for the log producer, such that the log producer can decrypt the dataset that is encrypted using the symmetric key. A log of the dataset is generated when the log producer accesses the dataset.

20 Claims, 8 Drawing Sheets

(56) References Cited

U.S. PATENT DOCUMENTS

| | | | |
|---|---|---|---|
| 2007/0288768 A1* | 12/2007 | Nesta | H04L 9/0833 |
| | | | 713/194 |
| 2009/0300712 A1* | 12/2009 | Kaufmann | G06F 21/6218 |
| | | | 707/999.1 |
| 2012/0173881 A1* | 7/2012 | Trotter | H04L 9/0894 |
| | | | 713/189 |
| 2013/0191627 A1* | 7/2013 | Ylonen | H04L 63/16 |
| | | | 713/150 |
| 2013/0198522 A1 | 8/2013 | Kohno et al. | |
| 2014/0019753 A1 | 1/2014 | Lowry et al. | |
| 2014/0032932 A1 | 1/2014 | Hiar et al. | |
| 2017/0103228 A1* | 4/2017 | Yavuz | H04L 9/14 |
| 2017/0302679 A1* | 10/2017 | Caramico | H04L 63/20 |
| 2020/0117825 A1* | 4/2020 | Vaswani | H04L 9/0897 |

* cited by examiner

SYSTEMS AND METHODS FOR SELECTIVE ACCESS TO LOGS

CROSS REFERENCE TO RELATED APPLICATIONS

This application is a continuation of U.S. patent application Ser. No. 15/991,366, filed May 29, 2018, which claims the benefit under 35 U.S.C. § 119(e) of U.S. Provisional Application Ser. No. 62/595,857, filed Dec. 7, 2017, the content of which is incorporated by reference in its entirety into the present disclosure.

FIELD OF THE INVENTION

This disclosure relates to approaches for managing access to logs of datasets (e.g., logs that are generated when the datasets are accessed).

BACKGROUND

Under conventional approaches, computing systems may require hard deletion of certain records including sensitive information (e.g., confidential information), such as logs of datasets, which may indicate a user's intent with respect to the dataset, in order to maintain integrity of the records. Currently, there is no secure way to selectively delete (or redact) sensitive information such that unauthorized users are prohibited from accessing the sensitive information. In addition, in some instances, particular data of the sensitive information may need to be maintained, for example, when users of high-level authority need to maintain access to the sensitive information, while access to the sensitive information by users of low-level authority is prohibited.

SUMMARY

Various embodiments of the present disclosure can include systems, methods, and non-transitory computer readable media. In some embodiments, a first system includes one or more processors, and a memory storing instructions that, when executed by the one or more processors, cause the system to perform first operations. The first operations include encrypting a symmetric key for dataset into first and second keys, using a public key of a log producer that has authority to produce a log for the dataset and a public key of a log accessor that has authority to access the log, respectively, and storing the first and second keys in a first datastore. The first operations further include storing encrypted dataset obtained by encrypting the dataset using the symmetric key in a second datastore. The first operations further include returning the first key, in response to a request from a user having authority as the log producer, such that the user can decrypt the first key using a secret key of the log producer, and accesses the encrypted dataset and generate an encrypted log using the decrypted first key. The first operations further include deleting the second key from the first datastore, in response to a request for deletion, such that a user having the authority as the log accessor cannot decrypt the encrypted log.

In some embodiments, the first operations further include deleting the second key from the first datastore, in response to a request for deletion, such that a user having the authority as the log accessor cannot decrypt the encrypted log. In some embodiments, the first operations further include encrypting the symmetric key for the dataset into a third key using a public key of a second log accessor that has second authority to access the log. The third key is maintained in the first datastore upon deletion of the second key. In some embodiments, the first operations further include storing, in the first datastore, the first and second keys in association with an identifier of the log producer and an identifier of the log accessor, respectively, and returning the second key, in response to a request that has the identifier of the log accessor and received before the second key is deleted.

In some embodiments, the first operations further include storing, in the second datastore, the encrypted log in association with the dataset. In some embodiments, the first operations further include storing, in the first datastore, the first and second keys in association with an identifier of the log producer and an identifier of the log accessor, respectively, and returning the first key, in response to a request having the identifier of the log producer.

In some embodiments, the first operations further include storing, in a third datastore, a secret key of the log producer corresponding to the public key of the log producer and a secret key of the log accessor corresponding to the public key of the log accessor. In some embodiments, the first operations further include returning the secret key of the log producer, in response to a request from a user having authority as the log producer, and returning the secret key of the log accessor, in response to a request from a user having authority as the log accessor.

In some embodiments, a second system includes one or more processors, and a memory storing instructions that, when executed by the one or more processors, cause the system to perform second operations. The second operations include obtaining, from a first server, an encrypted symmetric key for dataset, the encrypted symmetric key being encrypted using a public key of a log producer, and decrypting the obtained encrypted symmetric key using a secret key of the log producer corresponding to the public key. The second operations further include obtaining, from a second server, encrypted dataset that is generated by encrypting the dataset, decrypting the encrypted dataset using the decrypted symmetric key, and upon access to the decrypted dataset, generating a log and encrypting the log using the decrypted symmetric key.

In some embodiments, the second operations further include generating an asymmetric key pair of the public key and the secret key of the log producer, and transmitting the public key and the secret key to different datastores. In some embodiments, the second operations further include obtaining the secret key from the datastore when the dataset is accessed.

In some embodiments, the second operations further include transmitting the encrypted log to the second server, such that the encrypted log is stored in associated with the encrypted dataset. In some embodiments, the second operations further include transmitting a request with an identifier of the log producer and an identifier of the dataset to the first server, to obtain the encrypted symmetric key. In some embodiments, the second operations further include transmitting a request with an identifier of the log producer and an identifier of the dataset to the second server, to obtain the encrypted dataset.

In some embodiments, a third system includes one or more processors, and a memory storing instructions that, when executed by the one or more processors, cause the system to perform third operations. The third operations include obtaining, from a first server, an encrypted symmetric key for dataset, the encrypted symmetric key being encrypted using a public key of a log accessor, and decrypting the obtained encrypted symmetric key using a secret key of the log accessor corresponding to the public key. The third operations further include obtaining, from a second server, an encrypted log that is generated by encrypting a log that is generated when the dataset is accessed by a log producer, and decrypting the encrypted log using the decrypted symmetric key.

In some embodiments, the third operations further include generating an asymmetric key pair of the public key and the secret key of the log accessor; and transmitting the public key and the secret key to different datastores. In some embodiments, the third operations further include obtaining the secret key from a third server when the dataset is accessed.

In some embodiments, the third operations further include transmitting, to the first server, a request to delete a second encrypted symmetric key for the dataset. The second encrypted symmetric key is encrypted using a public key of a second log accessor different from the log accessor. In some embodiments, the third operations further include transmitting a request with an identifier of the log accessor and an identifier of the dataset to the first server, to obtain the encrypted symmetric key. In some embodiments, the third operations further include transmitting a request with an identifier of the log accessor and an identifier of the dataset to the second server, to obtain the encrypted log.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
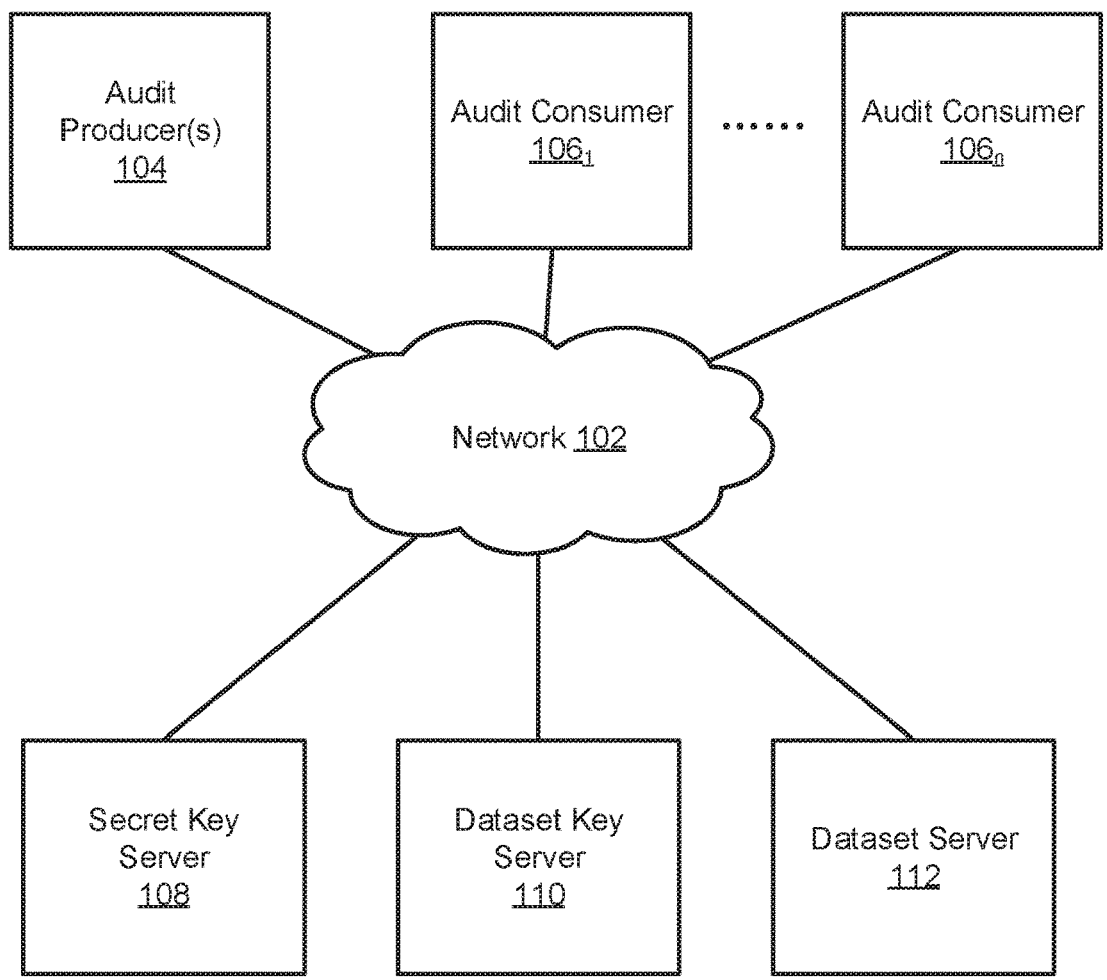
FIG. 1 is a schematic diagram depicting an example of a system for securely managing audit logs of datasets, in accordance with various embodiments.

Logs generated upon access to datasets (e.g., pre-existing datasets) may include sensitive information. For example, the logs may reflect user intent with respect to the datasets. Under conventional approaches, computing systems would perform hardware-based deletion of certain logs including sensitive information (e.g. confidential information) in order to maintain integrity of a dataset and/or logs of the dataset. Once the sensitive information is permanently deleted from data repository on hardware basis, no user can access the deleted sensitive information. However, in some instances, the sensitive information may need to be maintained while restricting access by some users without sufficient authority. For example, users of high-level authority need to maintain access to the sensitive information, while limiting access to the sensitive information by users of low-level authority, such that the users of high-level authority maintain access to logs generated upon access by the users of low-level authority. Therefore, a computer system that maintains integrity of datasets and logs thereof (e.g., without hardware-based deletion of the sensitive information) may be required.

A claimed solution rooted in computer technology overcomes problems specifically arising in the realm of computer technology. In various implementations, a computing system employs a combination of symmetric and asymmetric encryption. Specifically, a computing system encrypts a symmetric key for a dataset into a plurality of keys corresponding to a plurality of users, using a public key of a log producer that has authority to produce a log for the dataset and public keys of log accessors that have authority to access the log. Then, the encrypted symmetric keys are stored in a datastore (e.g., dataset key server). Also, private keys corresponding to the public keys of the log producer and the log accessors are stored in a datastore (e.g., secret key server). When the computing system receives a request from a user having authority as a log producer, the computing system returns an encrypted symmetric key that is encrypted using the public key of the log producer, such that the user decrypts the encrypted symmetric key using the private key of the log producer obtained from the datastore (e.g., secret key server), and decrypts the dataset that is encrypted using the symmetric key. Similarly, when the computing system receives a request from a user having authority as a log accessor, the computing system returns an encrypted symmetric key that is encrypted using a public key of the log accessor, such that the user decrypts the encrypted symmetric key using the private key of the log accessor obtained from the datastore (e.g., secret key server), and decrypts a log generated by access to the dataset by the log producer. When a particular one of the log accessors is no longer allowed to access the log, the computing system delete the encrypted symmetric key corresponding to the particular log accessor from the datastore (e.g., dataset key server).

FIG. 1 is a schematic diagram depicting an example of a system 100 for securely managing audit logs of datasets, in accordance with various embodiments. In the example depicted in FIG. 1, the system 100 includes a network 102, audit producer(s) 104, a plurality of audit consumers 106$_1$-106$_n$ (hereinafter collectively referred to as 106), a secret key server 108, a dataset key server 110, and a dataset server 112. The audit producer(s) 104, the plurality of audit consumers 106, the secret key server 108, the dataset key server 110, and the dataset server 112 are coupled to the network 102.

In the example of FIG. 1, the network 102 is intended to represent a variety of potentially applicable technologies. For example, the network 102 can be used to form a network or part of a network. Where two components are co-located on a device, the network 102 can include a bus or other data conduit or plane. Depending upon implementation-specific or other considerations, the network 102 can include wired communication interfaces and wireless communication interfaces for communicating over wired or wireless communication channels. Where a first component is located on a first device and a second component is located on a second (different) device, the network 102 can include a wireless or wired back-end network or LAN. The network 102 can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the network 102 can include a private cloud under the control of an enterprise or third party, or a public cloud.

In the example of FIG. 1, each of the audit producer(s) 104, the plurality of audit consumers 106, the secret key server 108, the dataset key server 110, and the dataset server 112 may represent one or more computing devices including one or more processors and memory. The processors can be configured to perform various operations by interpreting machine-readable instructions.

The audit producer(s) 104 may include one or more users (e.g., human and/or artificial agent), each of which may be eligible to have authorization to access a dataset stored in the dataset server 112, and possibly a user (human or artificial agent) that has no access privilege and/or limited access privilege to access a dataset stored in the dataset server 112. In some embodiments, the audit producer(s) 104 accesses the secret key server 108 and/or the dataset key server 110 to obtain data (e.g., keys) that is required to access the dataset stored in the dataset server 112.

In some embodiments, when the audit producer(s) 104 accesses a dataset in the dataset server 112, an audit log of the specific access to the datastore is generated. Depending on a specific implementation of the embodiments, the audit log may be generated in the audit producer(s) 104 or in the dataset server 112, and stored in the dataset server 112. In some embodiments, the audit log includes a secure audit log including secure data components that requires authorization to access and a non-secure audit log without the secure data components. For example, the secure data components may include confidential information that should be disclosed to users (human or artificial agents) of certain privilege. In some embodiments, a single audit log includes a secure data portion and non-secured data portion. The secured data portion and the non-secured data portion have similar characteristics as the secure audit log and the non-secure audit log, respectively. The secure audit log and/or the secure data portion of an audit log are stored in a secure manner, for example, in the dataset server 112. In some embodiments, a plurality of audit logs generated in accordance with access to a dataset may be stored and managed separately based on users (e.g., the audit producers) who accessed the dataset. For example, one or more audit logs generated in accordance with access to a dataset by a first user are stored and managed separately from one or more audit logs generated in accordance with access to the dataset by a second user. Such separate storage and malmanagement of audit logs enable more secure management thereof.

Each of the audit consumers 106 may include a user (e.g., human and/or artificial agent) that is eligible to have authorization to access one or more of audit logs that are generated upon access by the audit producer(s) 104. In some embodiments, each of the audit consumers 106 accesses the secret key server 108 and/or the dataset key server 110 to obtain data (e.g., keys) that are required to access the audit logs in the dataset server 112.

In some embodiments, the audit consumers 106 are categorized into a plurality of classes (i.e., the audit consumers 106$_1$-106$_n$) corresponding different audit roles. That is, the audit consumer 106$_1$ may correspond to an audit consumer of a first class (or first audit role), the audit consumer 106$_2$ may correspond to an audit consumer of a second class (or second audit role), and so on. In a specific implementation of the embodiments, each class of audit consumers may have a unique access privilege to datasets in the dataset server 112, or a unique access privilege to audit logs in the dataset server 112. In a specific implementation of the embodiments, the audit roles of the audit consumers may include an audit administrator, an analytics role, a branch information manager, an organizational information manager, and/or an inspector general. The audit administrator has a role of reading audit logs (occasionally) to check if the audit logs are being produced correctly. The audit analyst has a role of reading audit logs to feed analytics (e.g., for machine learning). The branch information manager has a role of reading audit logs to check on activities of the audit analyst. The organizational information manager also has a role of reading audit logs to check on the activities of the audit analyst. The organizational information manager may be limited to human agents, or users who have access to the dataset. The inspector general includes an internal or external authority that requires special investigative powers. The inspector general may be limited to human agents, or users who have access to the dataset.

The secret key server 108 is intended to represent a datastore for storing secret keys. In some embodiments, the secret keys includes a secret key (private key) unique to the audit producer 104, a secret key unique to each of the audit consumers 106. A secret key is a part of asymmetric key pair that includes the secret key and a public key, and data encrypted by a public key is decryptable by a corresponding secret key. In some embodiments, the secret keys are securely stored in the secret key server 108 such that only a user of a secret key have access to the secret key in the secret key server 108. In some embodiments, public key(s) of the audit producer(s) 104 and public keys of the audit consumers 106 are openly disseminated for encryption of data. For example, the public key(s) of the audit producer(s) 104 and the public keys of the audit consumers 106 are disseminated to the dataset key server 110.

The dataset key server 110 is intended to represent a datastore for storing dataset keys of datasets. In some embodiments, a dataset key of a dataset is a symmetric key, which can be used for both encryption and decryption of data. Depending on a specific implementation of the embodiments, a single dataset key may corresponds to a single dataset or a group of datasets. The symmetric key employs an applicable encryption standard and algorithm, such as advanced encryption standard (AES), Anubis, GrandCru, data encryption standard (DES). In some embodiments, a dataset key is generated when corresponding dataset(s) is generated (e.g., by a user who created the dataset(s)). In some embodiments, a dataset key for a dataset stored in the dataset key server 110 is encrypted using each of the public keys of the audit producer(s) 104 and the public keys of the audit consumers 106. Depending on a specific implementation of the embodiments, a user who created the dataset, the dataset key server 110, the dataset server 112, or another agent encrypts the dataset key.

The dataset server 112 is intended to represent a datastore for storing at least datasets. In some embodiments, the datasets in the dataset server 112 are encrypted using corresponding dataset keys. In some embodiments, the dataset server 112 also stores audit logs corresponding to the datasets in association with the datasets. Further, when the audit logs are stored in the dataset server 112, the audit logs are encrypted using dataset keys of corresponding dataset.

Figure 2:
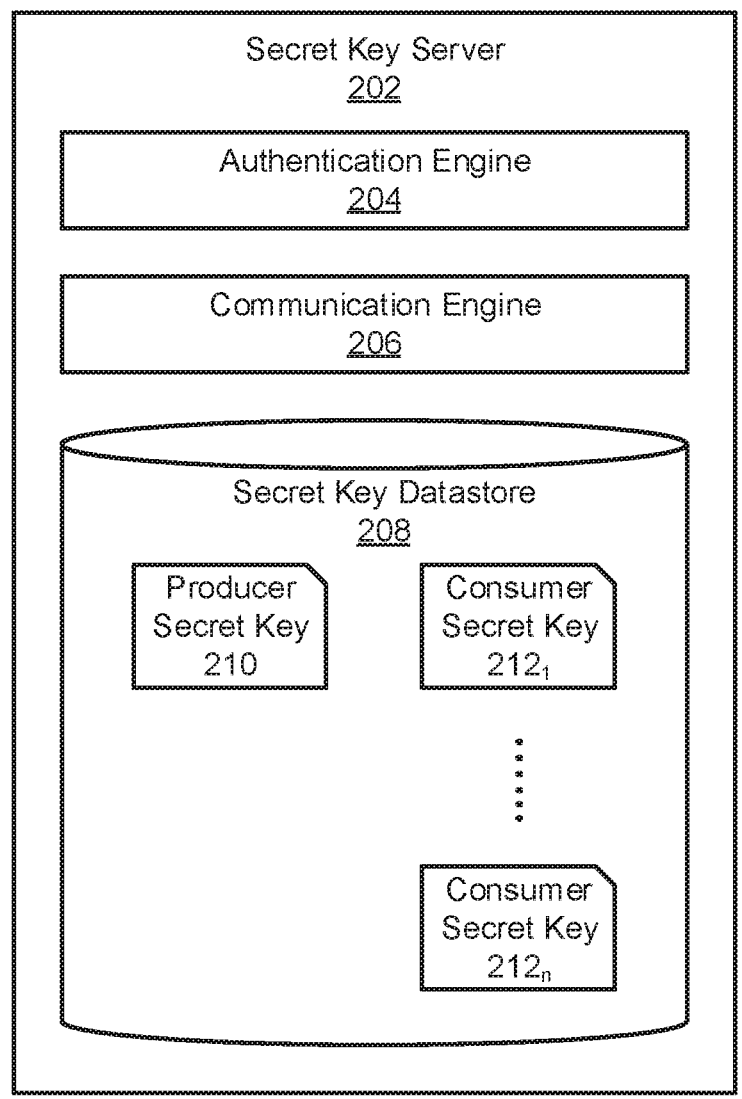
FIG. 2 is a schematic diagram depicting an example of a secret key server according to some embodiments.

FIG. 2 is a schematic diagram depicting an example of a secret key server 202 according to some embodiments. In an embodiment, the secret key server 202 corresponds to the secret key server 108 depicted in FIG. 1. In the example depicted in FIG. 2, the secret key server 202 includes an authentication engine 204, a communication engine 206, and a secret key datastore 208.

The authentication engine 204 functions to perform authentication of a user when an access request is received from the user through a communication interface (not shown) of the secret key server 202. Depending on a specific implementation of embodiments, the authentication engine 204 employs an applicable authentication scheme to perform the authentication. For example, the authentication engine 204 may employ certificate-based authentication, passcode-based authentication, and biometric-based authentication, and/or a combination thereof. Depending on a specific implementation of embodiments, data transacted for the authentication are encrypted to ensure more secure management of the secret keys in the authentication engine 204.

The communication engine 206 functions to manage communication with external devices, such as the audit producer(s) 104 and the audit consumers 106 in FIG. 1. Depending on a specific implementation of embodiments, the communication engine 206 employs an applicable communication scheme to perform the communication. For example, the communication engine 206 perform encryption and/or decryption of data communication with the external devices, error detection (and correction) of data communication with the external devices and so on.

The secret key datastore 208 is intended to represent storage configured to store secret key(s) of audit producer(s) (e.g., audit producer(s) 104 in FIG. 1) and secret keys of audit consumers of different classes (e.g., audit consumers 106 in FIG. 1). Depending on a specific implementation of embodiments, the secret key datastore 208 employs an applicable data storage scheme to ensure secure data storage therein. For example, the secret key datastore 208 may encrypt data stored therein, compartmentalize data, dynamically change data storage locations, or perform combination thereof.

Figure 3:
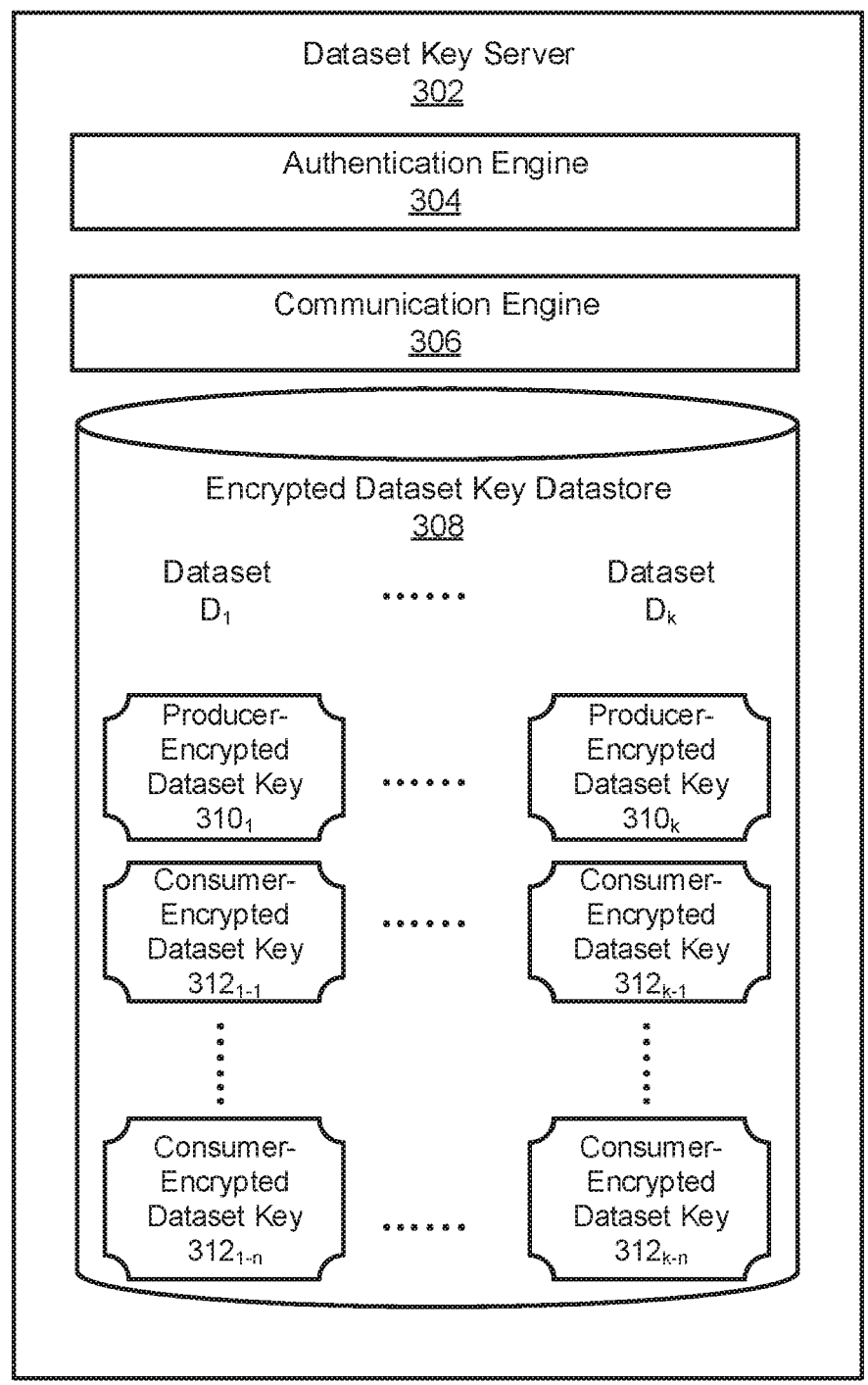
FIG. 3 is a schematic diagram depicting an example of a dataset key server according to some embodiments.

FIG. 3 is a schematic diagram depicting an example of a dataset key server 302 according to some embodiments. In an embodiment, the dataset key server 302 corresponds to the dataset key server 110 depicted in FIG. 1. In the example depicted in FIG. 3, the dataset key server 302 includes an authentication engine 304, a communication engine 306, and an encrypted dataset key datastore 308.

The authentication engine 304 functions to perform authentication of a user when an access request is received from the user through a communication interface (not shown) of the dataset key server 302. Depending on a specific implementation of embodiments, the authentication engine 304 employs an applicable authentication scheme to perform the authentication, in a similar manner as the authentication engine 204 of the secret key server 202.

The communication engine 306 functions to manage communication with external devices, such as the audit producer(s) 104 and the audit consumers 106 in FIG. 1. Depending on a specific implementation of embodiments, the communication engine 306 employs an applicable communication scheme to perform the communication, in a similar manner as the authentication engine 206 of the secret key server 202.

The encrypted dataset key datastore 308 is intended to represent storage configured to store dataset keys of one or more datasets. In some embodiments, with respect to each dataset, a plurality of encrypted dataset keys corresponding audit producer(s) (e.g., the audit producer(s) 104 in FIG. 1) and audit consumers (e.g., the audit consumers 106 in FIG. 1) are stored. For example, as depicted in FIG. 3, in association with a dataset identifier "$D_1$" of a dataset, a producer-encrypted dataset key $310_1$ encrypted using a public key of an audit producer and a plurality of consumer-encrypted dataset keys $312_{1-1}$-$312_{1-n}$, each encrypted using a public key of a corresponding audit producer, are stored in association with a corresponding audit role identifier (e.g., "P" for audit producer, and "$C_1$" through "$C_k$" for audit consumers). Similarly, in association with a dataset identifier "$D_k$" of a dataset, a producer-encrypted dataset key $310_k$ encrypted using a public key of an audit producer and a plurality of consumer-encrypted dataset keys $312_{k-1}$-$312_{k-n}$, each encrypted using a public key of a corresponding audit producer, are stored in association with a corresponding audit role identifier (e.g., "P" for audit producer, and "$C_1$" through "$C_k$" for audit consumers). Depending on a specific implementation of embodiments, the encrypted dataset key datastore 308 employs an applicable data storage scheme to ensure secure data storage therein, in a similar manner as the secret key datastore 208 of the secret key server 202.

The encrypted dataset key datastore 308 is capable of deleting a consumer-encrypted dataset key in response to a request, upon successful authentication of the request and/or a sender of the request by the authentication engine 304. In some embodiments, the request is successfully authenticated when the sender is authorized to perform deletion. In a more specific implementation, the sender is authorized to perform the deletion when the sender is of a consumer role or class higher than the audit consumer of the role or class subjected to deletion in a hierarchy. For example, only the inspector general may have authority to perform deletion.

Figure 4:
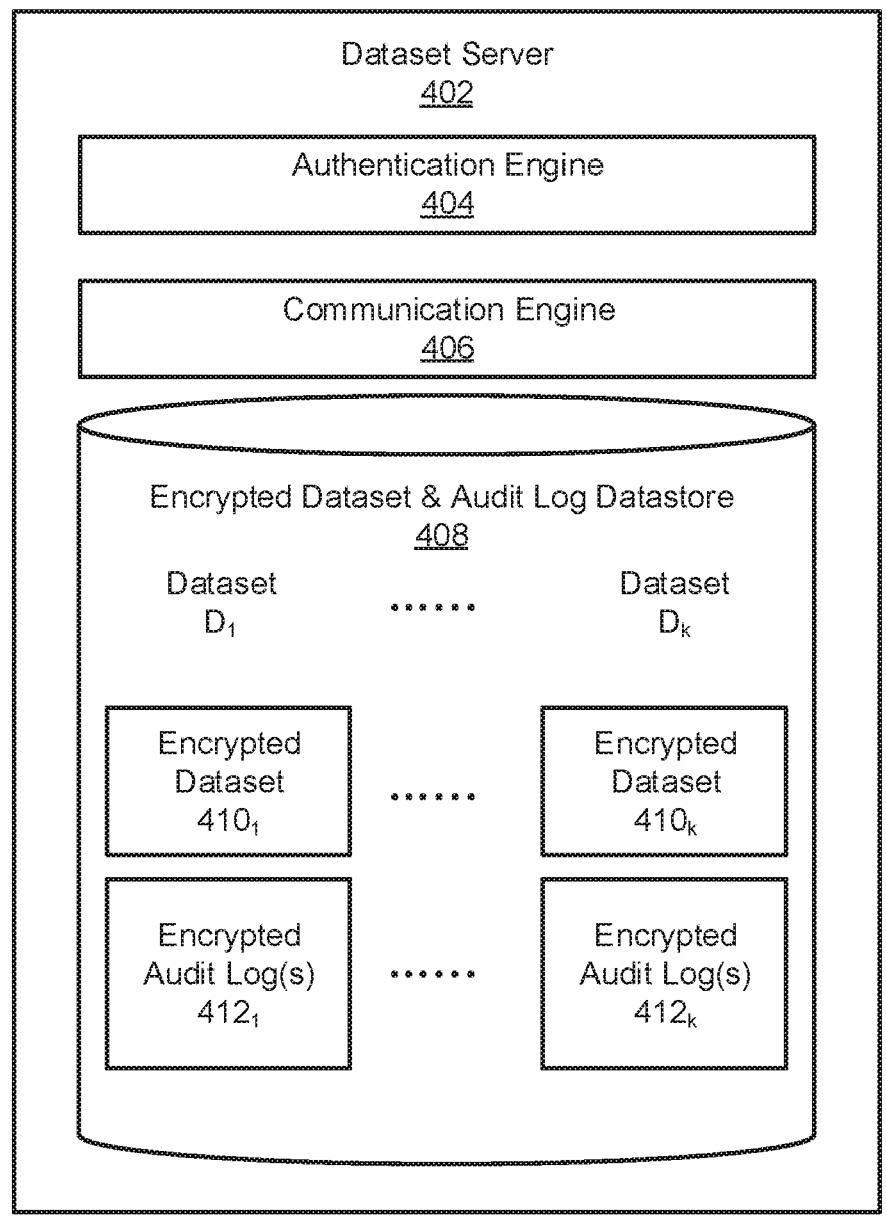
FIG. 4 is a schematic diagram depicting an example of a dataset server according to some embodiments.

FIG. 4 is a schematic diagram depicting an example of a dataset server 402 according to some embodiments. In an embodiment, the dataset server 402 corresponds to the dataset server 112 depicted in FIG. 1. In the example depicted in FIG. 4, the dataset server 402 includes an authentication engine 404, a communication engine 406, and an encrypted dataset and audit log datastore 408.

The authentication engine 404 functions to perform authentication of a user when an access request is received from the user through a communication interface (not shown) of the dataset server 402. Depending on a specific implementation of embodiments, the authentication engine 404 employs an applicable authentication scheme to perform the authentication, in a similar manner as the authentication engine 204 of the secret key server 202 and/or the authentication engine 304 of the dataset key server 302.

The communication engine 406 functions to manage communication with external devices, such as the audit producer(s) 104 and the audit consumers 106 in FIG. 1. Depending on a specific implementation of embodiments, the communication engine 406 employs an applicable communication scheme to perform the communication, in a similar manner as the authentication engine 206 of the secret key server 202 and/or the communication engine 306 of the dataset key server 302.

The encrypted dataset and audit log datastore 408 is intended to represent storage configured to store a dataset key of one or more datasets. In some embodiments, with respect to each dataset, a dataset encrypted using its corresponding dataset key and one or more audit logs that are generated in association with the dataset and encrypted using the corresponding dataset key are stored. For example, as depicted in FIG. 4, in association with a dataset identifier "$D_1$," of a dataset, an encrypted dataset $410_1$ that is encrypted using a dataset key thereof and one or more of audit logs $412_1$, if any, that are also encrypted using the dataset key of the dataset $_{D1}$ are stored. Similarly, in association with a dataset identifier "$D_k$," of a dataset an encrypted dataset $410_k$ that is encrypted using a dataset key thereof and one or more audit logs $412_k$, if any, that are also encrypted using the dataset key of the dataset $D_k$ are stored. Depending on a specific implementation of embodiments, the encrypted dataset and audit log datastore 408 employs an applicable data storage scheme to ensure secure data storage therein, in a similar manner as the secret key datastore 208 of the secret key server 202 and/or the encrypted dataset key datastore 308 of the dataset key server 302.

Figure 5:
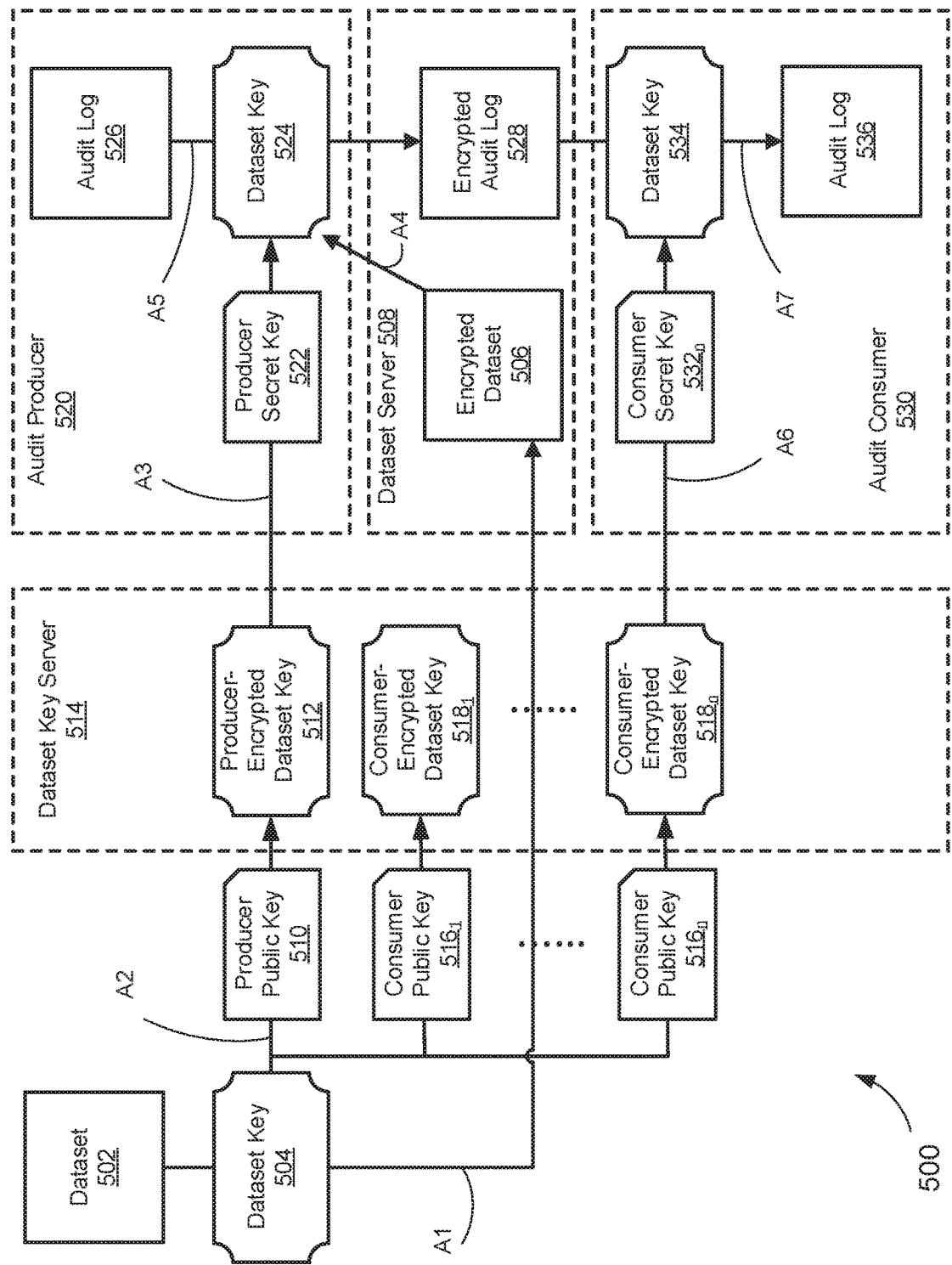
FIG. 5 is a schematic diagram depicting an example of a flow of dataset involved in a system for securely managing audit logs of datasets according to some embodiments.

FIG. 5 is a schematic diagram depicting an example of a flow 500 of data involved in a system for securely managing audit logs of datasets according to some embodiments. In some embodiments, an audit producer 520, an audit consumer 530, a dataset server 508, a dataset key server 514 depicted in FIG. 5 correspond to the audit producer 104, the audit consumer $106_n$, the dataset key server 110, and the dataset server 112 depicted in FIG. 1, respectively.

When an audit role such as an audit producer and an audit consumer, is created, an asymmetric key pair of a public key and a secret key is generated. Specifically, a pair of a producer public key 510 and a producer secret key 522 is generated for an audit producer. Similarly, a pair of a consumer public key 516 and a consumer secret key 532 is generated for each of audit consumers 530 (consumer 1 through consumer n). In some embodiments, the generated producer secret key 522 and the generated consumer secret keys $532_{1-n}$ are securely stored in a secret key server (e.g., the secret key server 108 in FIG. 1).

When a dataset 502 is created, a dataset key 504 of the dataset 502, which is a symmetric key, is generated. The dataset 502 is encrypted into an encrypted dataset 506, using the dataset key 504, and the encrypted dataset 506 is stored in a dataset server 508 (arrow A1). Further, the generated dataset key 504 is encrypted using each of the producer public key 510 and the consumer public keys $516_{1-n}$ into a producer-encrypted dataset key 512 and consumer-encrypted dataset keys $518_{1-n}$, respectively and stored in the dataset key server 514 (arrow A2).

When the audit producer 520 (i.e., a user having a role of the audit producer) accesses the dataset 502, the audit producer 520 sends to the dataset key server 514 a request for the producer-encrypted dataset key 512 along with a dataset identifier (e.g., "$D_k$") of the dataset 502 and an audit producer identifier (e.g., "P"). In response, the producer-encrypted dataset key 512 returns the producer-encrypted dataset key 512 upon authentication of the audit producer 520. The returned producer-encrypted dataset key 512 is decrypted using the producer secret key 522, which is obtained from the secret key server, and a dataset key 524, which can be the same as the dataset key 504, is generated (arrow A3).

After receiving the producer-encrypted dataset key 512, the audit producer 520 sends to the dataset server 508 a request for the encrypted dataset 506 along with the dataset identifier (e.g., "$D_k$") and further the producer identifier. In response, the dataset server 508 returns the encrypted dataset 506 upon authentication of the audit producer 520 (arrow A4). Then, the audit producer 520 decrypts the encrypted dataset 506 into the dataset 502 (or a copy thereof) using the dataset key 524 and obtains access to the dataset 502. When the audit producer 520 accesses the dataset 502, an audit log 526 for secure purpose is generated. The generated audit log 526 is encrypted into an encrypted audit log 528 using the dataset key 524, and the encrypted audit log 528 is stored in the dataset server 508 in association with the encrypted dataset 506 (arrow A5).

In some embodiments, use of the dataset key 524 has an applicable restriction so as to improve security of data in the dataset server 508 accessible with the dataset key 524, which might be improperly accessed by unauthorized entities. For example, the dataset key 524 is timestamped and usable only for a limited period of time. In another example, the dataset key 524 becomes unusable upon the encrypted audit log 508 is generated.

When the audit consumer 530 of a specific role or class (i.e., a user having a specific role or class of the audit consumer) accesses the encrypted audit log 508 (may also the encrypted dataset 506), the audit consumer 530 sends to the dataset key server 514 a request for a consumer-encrypted dataset key 514 corresponding thereto along with the dataset identifier (e.g., "$D_k$") of the dataset 502 and an audit consumer identifier of the role or class (e.g., "$C_n$"). In response, the dataset server 508 returns the consumer-encrypted dataset key $518_n$ upon authentication of the audit consumer 530 (arrow A6). The returned consumer-encrypted dataset key $518_n$ is decrypted using the consumer secret key $532_n$ corresponding to the rule or class, which is obtained from the secret key server, and a dataset key 534, which can be the same as the dataset key 504, is generated (arrow A6).

After receiving the consumer-encrypted dataset key $518_n$, the audit consumer 530 sends to the dataset server 508 a request for the encrypted audit log 528 (and also dataset 506) along with the dataset identifier (e.g., "$D_k$"), and also the consumer identifier. In response, the dataset server 508 returns the encrypted audit log 528 (and also the encrypted dataset 506) upon authentication of the audit consumer 530 (arrow A4). Then, the audit consumer 530 decrypts the encrypted audit log 528 into an audit log 536 using the dataset key 534 and obtains access to the audit log 536 (arrow A7).

In some embodiments, use of the dataset key 534 has an applicable restriction, similarly to the dataset key 524, so as to improve security of data in the dataset server 508 accessible with the dataset key 534, which might be improperly accessed by unauthorized entities.

When an audit consumer of a role or a class should no longer have access to the dataset 502 (encrypted dataset 506)

or the audit log 526 (encrypted audit log 528), a consumer-encrypted dataset key 518 stored in the dataset key server 514 is deleted. Since the audit consumer for which corresponding consumer-encrypted dataset key 518 has been deleted can no longer have a decrypted dataset key to decrypt the encrypted dataset 506 and the encrypted audit log 528. Therefore, the audit consumer of the role or class loses access to the dataset 502 and the audit log 526. On the other hand, the consumer-encrypted dataset keys 518 for audit consumers of the other roles or classes remain in the dataset key server 514. For that reason, the audit consumers of the other roles or classes do not lose access to the dataset 502 and the audit log 526. In this manner, by selectively deleting a consumer-encrypted dataset key corresponding to an audit consumer of a specific role or class from the dataset key server 514, access to a specific dataset and a specific audit log can be selectively restricted for the audit consumer of the specific role or class.

Figure 6:
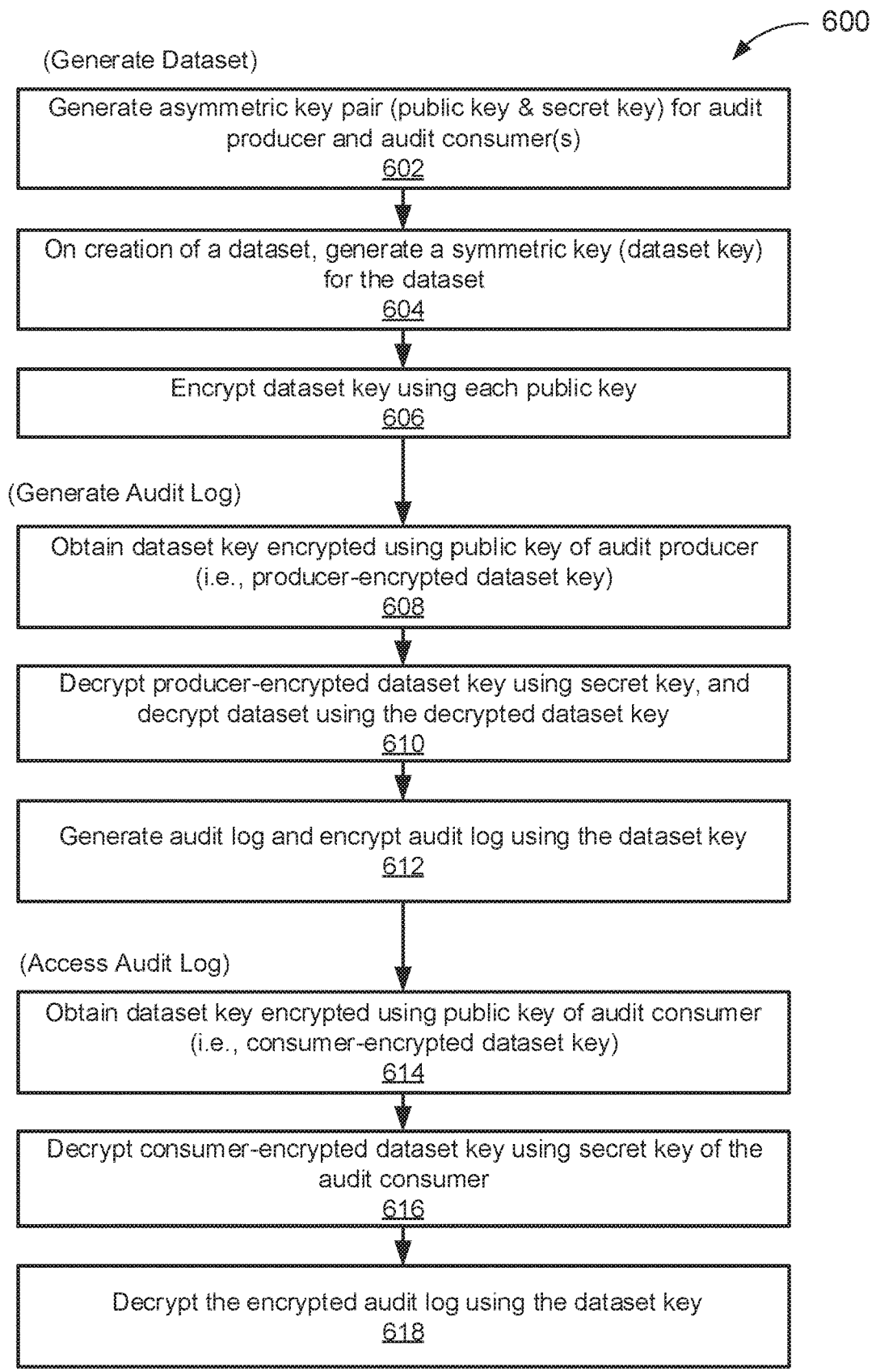
FIG. 6 is a flowchart of an example of a method for securely managing and providing access to audit logs of datasets according to some embodiments.

FIG. 6 is a flowchart 600 of an example of a method for securely managing and providing access to audit logs of datasets according to some embodiments. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In FIG. 6, modules 602-606 are carried out before or when a dataset is created. Specifically, in module 602, an asymmetric key pair (i.e., a public key and a secret key) is generated for each of audit producer(s) and audit consumers of different roles. An applicable device or system for generating asymmetric key pairs (e.g., the audit producer(s) 104 and the audit consumers 106 in FIG. 1) can generate the asymmetric key pairs.

In module 604, a symmetric key (dataset key) of a dataset is generated upon creation of the dataset. An applicable system for generating a symmetric key (e.g., a user creating the dataset) can generate the symmetric key.

In module 606, the symmetric key of the dataset is encrypted using each of the public keys of the audit producer(s) and audit consumers. An applicable system for encrypting a symmetric key (e.g., the dataset key server 110 in FIG. 1) can encrypt the symmetric key of the dataset.

In FIG. 6, modules 608-612 are carried out when an audit log is generated based on access to the dataset by an audit producer. Specifically, in module 608, a dataset key (i.e., producer-encrypted dataset key) that has been encrypted using a public key of the audit producer (obtained in module 606) is obtained by the audit producer from the dataset key server.

In module 610, the obtained producer-encrypted dataset key is decrypted by the audit producer using a secret key of the audit producer, and a decrypted dataset key (i.e., the dataset key) is obtained. Further, in module 610, an encrypted dataset stored in the dataset server is obtained from the dataset server and decrypted using the dataset key (obtained in module 608), and a decrypted dataset (i.e., the dataset) becomes accessible by the audit producer.

In module 612, upon access to the dataset, an audit log of the dataset is generated, and the generated audit log is encrypted using the dataset key (obtained in module 608) into an encrypted audit log, which is then stored in the dataset server.

In FIG. 6, modules 614-618 are carried out when the audit log (the encrypted audit log) is accessed by an audit consumer. Specifically, in module 614, a dataset key (i.e., consumer-encrypted dataset key) that has been encrypted using a public key of the audit consumer (obtained in module 606) is obtained by the audit consumer from the dataset key server.

In module 616, the obtained consumer-encrypted dataset key is decrypted by the audit consumer using a secret key of the audit consumer, and a decrypted dataset key (i.e., the dataset key) is obtained. Further, in module 616, the encrypted audit log stored in the dataset server is obtained from the dataset server.

In module 618, the obtained encrypted audit log is decrypted using the dataset key (obtained in module 614), and a decrypted audit log (i.e., the audit log) becomes accessible by the audit consumer.

Figure 7:
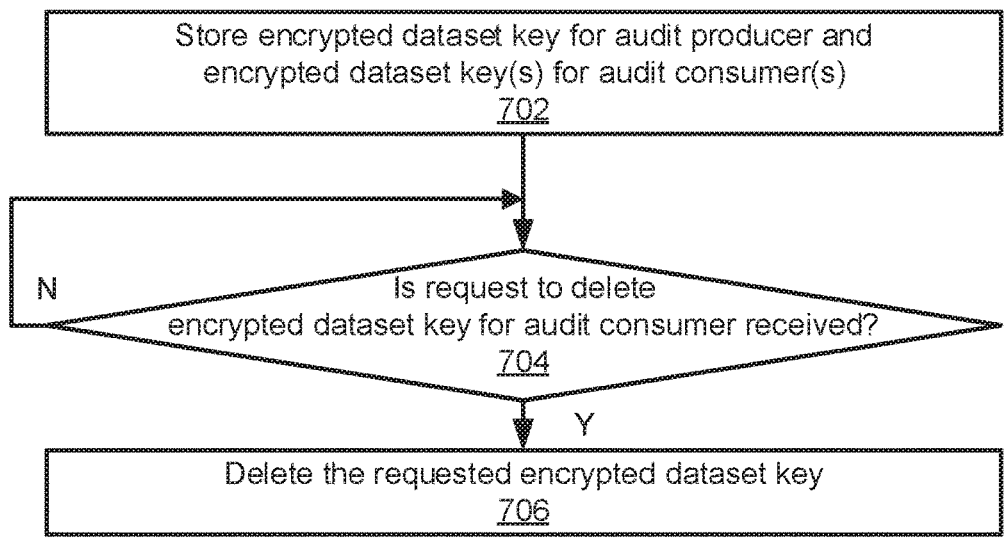
FIG. 7 is a flowchart of an example of a method for disabling access to audit logs of datasets according to some embodiments.

FIG. 7 is a flowchart 700 of an example of a method for disabling access to audit logs of datasets according to some embodiments. In FIG. 7, modules 702-706 are carried out by an applicable dataset key server such as the dataset key server 110 in FIG. 1.

In module 702, an encrypted dataset key (e.g., the producer-encrypted dataset key in module 606 of FIG. 6) for an audit producer and encrypted dataset keys (e.g., the consumer-encrypted dataset keys in module 606 of FIG. 6) for audit consumers of different roles or classes are stored in a dataset key server.

In decision point 704, it is determined whether or not a request to delete a consumer-encrypted dataset key is received. In some embodiments, the request to delete the consumer-encrypted dataset key is receivable or acceptable only from an audit consumer of a different role or class (e.g., higher in a hierarchy) from which the role or class for which the access is disabled. If the decision result of decision point 704 is yes (Y in FIG. 7), the flowchart 700 proceeds to module 706. If the decision result is no (N in FIG. 7), the flowchart 700 repeats the decision point 704.

In module 706, the consumer-encrypted dataset key corresponding to the received request is deleted from the dataset key server. Once, the consumer-encrypted dataset key is deleted, the audit consumer of the deleted role or class loses access to the corresponding dataset and the audit log.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
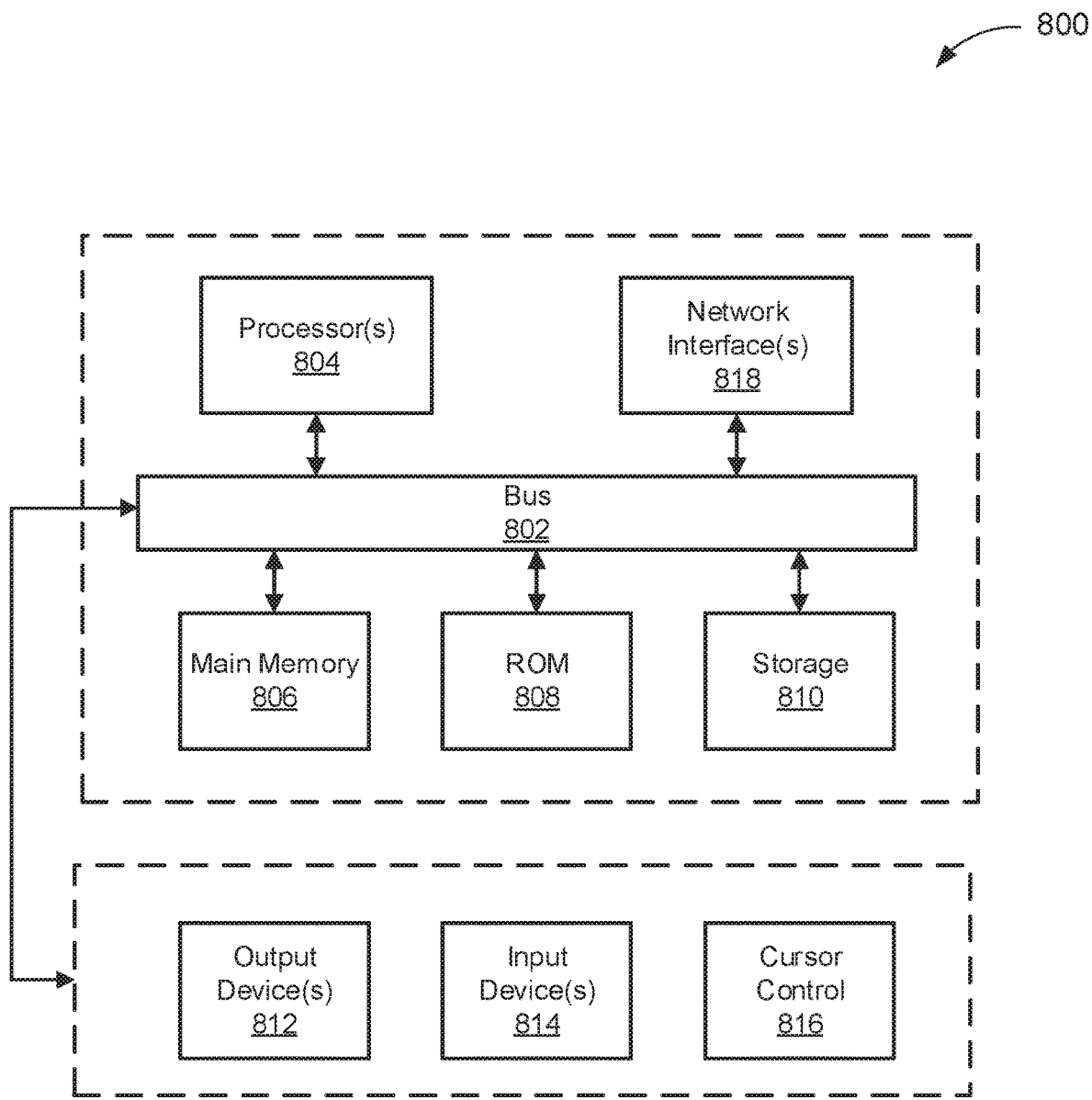
FIG. 8 illustrates a block diagram of an example computer system in which any of the embodiments described herein may be implemented.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 604. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 704. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a cathode ray tube (CRT) or LCD display (or touch screen), for displaying information to a computer user. An input device 814, including alphanumeric and other keys, is coupled to bus 602 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may comprise software engines (e.g., code embodied on a machine-readable medium) and/or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system, comprising:
one or more processors; and
a memory storing instructions that, when executed by the one or more processors, cause the system to perform:
generating a first key commensurate with a first access privilege to a dataset;
providing access to the dataset commensurate with the first access privilege in response to receiving and authenticating the first key;
in response to the providing of access to the dataset, generating a log for the dataset, the log being divided into a secured data portion commensurate with the first access privilege and an unsecured data portion commensurate with a second access privilege lower than the first access privilege, the secured data portion being inaccessible under the second access privilege.

2. The system of claim 1, wherein the instructions further cause the system to perform:
generating an additional key in response to generating an additional dataset;
encrypting the additional key;
storing the encrypted additional key within a first datastore;
receiving a request to access the additional dataset;
decrypting the encrypted additional key;
authenticating the decrypted additional key;
providing access to the additional dataset;
in response to providing the access, generating a log corresponding to the additional dataset; and
storing the log within a second datastore.

3. The system of claim 2, wherein the instructions further cause the system to perform:
encrypting the log, and wherein:
the providing of the access to the additional dataset comprises decrypting the additional dataset, wherein the additional dataset is stored in association with the log.

4. The system of claim 2, wherein the instructions further cause the system to perform:
encrypting the log corresponding to the additional dataset using the additional key.

5. The system of claim 4, wherein the encrypting of the additional key is via a public key.

6. The system of claim 4, wherein the instructions further cause the system to perform:
receiving a request for deletion of the additional key;
determining whether an access privilege corresponding to the request for deletion exceeds the first access privilege;
deleting the additional key in response to the access privilege exceeding the first access privilege; and
refraining from deleting the additional key in response to the access privilege being equal or less than the first access privilege.

7. The system of claim 2, wherein the encrypted additional key is decrypted using a secret key.

8. The system of claim 1, wherein the instructions further cause the system to perform:

inactivating the first key in response to the log being generated.

9. The system of claim 1, wherein the generating of the first key comprises encrypting a symmetric key based on a public key of a user corresponding to the first access privilege and decrypting the encrypted symmetric key.

10. The system of claim 1, wherein the instructions further cause the system to perform:
generating individual logs corresponding to individual access requests by different users, wherein the individual logs comprise respective secured data portions and unsecured data portions.

11. A system comprising:
one or more processors; and
a memory storing instructions that, when executed by the one or more processors, cause the system to perform:
obtaining, from a first server, an encrypted symmetric key for a dataset, the encrypted symmetric key being encrypted using a public key;
decrypting the obtained encrypted symmetric key using a secret key corresponding to the public key;
obtaining, from a second server, an encrypted dataset that is generated by encrypting the dataset;
decrypting the encrypted dataset using the decrypted symmetric key; and
upon access to the decrypted dataset, generating a log for the decrypted dataset, the log being divided into a secured data portion commensurate with the first access privilege and an unsecured data portion commensurate with a second access privilege lower than the first access privilege, the secured data portion being inaccessible under the second access privilege.

12. The system of claim 11, wherein the instructions further cause the system to perform:
generating an additional key in response to generating an additional dataset;
encrypting the additional key;
storing the encrypted additional key within a first datastore;
receiving a request to access the additional dataset;
decrypting the encrypted additional key;
authenticating the decrypted additional key;
providing access to the additional dataset;
in response to providing the access, generating a log corresponding to the additional dataset; and
storing the log within a second datastore.

13. The system of claim 12, wherein the instructions further cause the system to perform:
encrypting the log, and wherein:
the providing of the access to the additional dataset comprises decrypting the additional dataset, wherein the additional dataset is stored in association with the log.

14. The system of claim 12, wherein the instructions further cause the system to perform:
encrypting the log corresponding to the additional dataset using the additional key.

15. The system of claim 14, wherein the instructions further cause the system to perform:
receiving a request for deletion of the additional key;
determining whether an access privilege corresponding to the request for deletion exceeds the first access privilege;
deleting the additional key in response to the access privilege exceeding the first access privilege; and
refraining from deleting the additional key in response to the access privilege being equal or less than the first access privilege.

16. A system comprising:
one or more processors; and
a memory storing instructions that, when executed by the one or more processors, cause the system to perform:
obtaining, from a first server, an encrypted symmetric key for a dataset, the encrypted symmetric key being encrypted using a public key;
decrypting the obtained encrypted symmetric key using a secret key corresponding to the public key;
obtaining, from a second server, an encrypted log that is generated by encrypting a log that is generated when the dataset is accessed; and
decrypting the encrypted log using the decrypted symmetric key, wherein the encrypted log is divided into a secured data portion commensurate with the first access privilege and an unsecured data portion commensurate with a second access privilege lower than the first access privilege, the secured data portion being inaccessible under the second access privilege.

17. The system of claim 16, wherein the instructions further cause the system to perform:
generating an additional key in response to generating an additional dataset;
encrypting the additional key;
storing the encrypted additional key within a first datastore;
receiving a request to access the additional dataset;
decrypting the encrypted additional key;
authenticating the decrypted additional key;
providing access to the additional dataset;
in response to providing the access, generating a log corresponding to the additional dataset; and
storing the log within a second datastore.

18. The system of claim 17, wherein the instructions further cause the system to perform:
encrypting the log, and wherein:
the providing of the access to the additional dataset comprises decrypting the additional dataset, wherein the additional dataset is stored in association with the log.

19. The system of claim 17, wherein the instructions further cause the system to perform:
encrypting the log corresponding to the additional dataset using the additional key.

20. The system of claim 19, wherein the instructions further cause the system to perform:
receiving a request for deletion of the additional key;
determining whether an access privilege corresponding to the request for deletion exceeds the first access privilege;
deleting the additional key in response to the access privilege exceeding the first access privilege; and
refraining from deleting the additional key in response to the access privilege being equal or less than the first access privilege.

* * * * *